(12) United States Patent
Ho

(10) Patent No.: US 8,725,150 B2
(45) Date of Patent: May 13, 2014

(54) FEMTOCELL BASE STATION, AND A METHOD OF CONTROLLING A FEMTOCELL BASE STATION

(75) Inventor: Lester Tse Wee Ho, Wiltshire (GB)

(73) Assignee: Alcatel Lucent, Paris (FR)

( * ) Notice: Subject to any disclaimer, the term of this patent is extended or adjusted under 35 U.S.C. 154(b) by 512 days.

(21) Appl. No.: 12/949,249

(22) Filed: Nov. 18, 2010

(65) Prior Publication Data

US 2011/0125510 A1 May 26, 2011

(30) Foreign Application Priority Data

Nov. 20, 2009 (EP) .................................. 09290883

(51) Int. Cl.
*H04W 88/02* (2009.01)
(52) U.S. Cl.
USPC ....................................................... 455/436
(58) Field of Classification Search
USPC .............................................. 455/436–444
See application file for complete search history.

(56) References Cited

U.S. PATENT DOCUMENTS

| 8,285,293 | B2* | 10/2012 | Claussen et al. | 455/446 |
| 8,345,633 | B2* | 1/2013 | Bradley et al. | 370/331 |
| 2009/0092078 | A1 | 4/2009 | Czaja et al. | |
| 2009/0170516 | A1* | 7/2009 | Ostrup et al. | 455/436 |
| 2010/0095792 | A1* | 4/2010 | Stanovskoy et al. | 74/414 |
| 2013/0079020 | A1* | 3/2013 | Shahid et al. | 455/444 |

FOREIGN PATENT DOCUMENTS

EP 1 241 903 A2 9/2002

OTHER PUBLICATIONS

Motorola: "Text Proposal for TR 36.9xx: Reducing HeNB Interface by Dynamically Changing HeNB Access Mode," 3GPP Draft, R4-094688_DYNHENB_AMCHG_IM, $3^{rd}$ Generation Partnership Project (3GPP), Mobile Competence Centre, 650, Route Des Lucioles, F-06921 Sophia-Antipolis Cedex, France, No. Jeju, XP050394167, Nov. 9, 2009.
ZTE: "Principles on Access Mode Modification," 3GPP Draft, R3-091644 Principles on Access Mode Modification, $3^{rd}$ Generation Partnership Project (3GPP), 650 Route Des Lucioles, F-0692 Sophia-Antipolis Cedex, France, No. Shenzhen, China, XP050353034, Aug. 20, 2009.
"Technical Specification Group Radio Access Networks; 3G Home NodeB Study Item Technical Report (Release 8) V8.1.1," Internet Citation, pp. 1-40, XP002563253, May 1, 2008.
Lopez-Perez D. et al.: "OFDMA Femtocells: A Roadmap on Interference Avoidance—[Topics in radio Communications]," IEEE Communications Magazine, IEEE Service Center, Piscataway, US, vol. 47, No. 9, pp. 41-48, XP011277723, Sep. 1, 2009.

(Continued)

*Primary Examiner* — Diane Mizrahi
(74) *Attorney, Agent, or Firm* — Fay Sharpe LLP

(57) ABSTRACT

A femtocell base station is provided. The base station is switchable in use between a first mode of operation and a second mode of operation. In the first mode of operation only user terminals that are registered with the femtocell base station are connectable to the femtocell base station. In the second mode of operation a user terminal that is not registered with the femtocell base station is connectable to the femtocell base station.

21 Claims, 2 Drawing Sheets

(56) References Cited

OTHER PUBLICATIONS

"$3^{rd}$ Generation Partnership Project; Technical Specification Group Services and System Aspects, Service Requirements for Home NodeBs and Home eNodeBs (Release 10)," 3GPP Standard, 3GPP TS 22.220, $3^{rd}$ Generation Partnership Project (3GPP), Mobile Competence Centre, 650, Route Des Lucioles, F-06921 Sophia-Antipolis Cedex, France pp. 1-22, XP050361159, Sep. 1, 2009.

ETRE: "Access Mode Change of CSG Cell During Operation," 3GPP Draft, R3-091800, $3^{rd}$ Generation Partnership Project (3GPP), Mobile Competence Centre, 650, Route Des Lucioles, F-06921 Sophia-Antipolis Cedex, France, No. Shenzhen, China XP050353171, Aug. 20, 2009.

Alcatel-Lucent et al.: "Congested H(e)NB Hybrid Access Mode Cell," 3GPP Draft, R3-091053 Congested H(e)HB, $3^{rd}$ Generation Partnership Project (3GPP), Mobile Competence Centre, 650, Route Des Lucioles, F-06921 Sophia-Antipolis Cedex, France, No. San Francisco, USA, XP050341429, Apr. 29, 2009.

Hisham A. Mahmoud et al.: "A Comparative Study of Different Deployment Modes for Femtocell Networks," Persons, Indoor and Mobile Radio Communications, 2009 IEEE $20^{th}$ International Symposium on, IEEE, Piscataway, NJ, USO, pp. 1-5, XP031659738, Sep. 13, 2009.

Alvaro Valcarce et al.: "Limited Access to OFDMA Femtocells," Personal, Indoor and Mobile Radio Communications, 2009 IEEE $20^{th}$ International Symposium ON, IEEE, Piscataway, NJ, USA, pp. 1-5, XP031660126, Sep. 13, 2009.

European Search Report for EP 09290883.9 dated Jul. 22, 2010.

\* cited by examiner

FEMTOCELL BASE STATION, AND A METHOD OF CONTROLLING A FEMTOCELL BASE STATION

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as microcells, picocells, or femtocells, but we use the term femtocells generically for cells that are smaller than macrocells. One way to establish a femtocell is to provide a femtocell base station that operates within a relatively limited range within the coverage area of a macrocell. One example of use of a femtocell base station is to provide wireless communication coverage within a building.

The femtocell base station is of a relatively low transmit power and hence each femtocell is of a small coverage area compared to a macrocell.

Femtocell base stations are intended primarily for users belonging to a particular home or office. Femtocell base stations may be private access or public access. In femtocell base stations that are private access, access is restricted only to registered users, for example family members or particular groups of employees. In femtocell base stations that are public access, other users may also use the femtocell base station, subject to certain restrictions to protect the Quality of Service received by registered users.

One known type of Femtocell base station uses a broadband Internet Protocol connection as "backhaul", namely for connecting to the core network. One type of broadband Internet Protocol connection is a Digital Subscriber Line (DSL). The DSL connects a DSL transmitter-receiver ("transceiver") of the femtocell base station to the core network of a network for cellular telecommunications. The DSL allows voice calls and other services provided via the femtocell base station to be supported. The femtocell base station also includes a radio frequency (RF) transceiver connected to an antenna for radio communications.

Femtocell base stations are sometimes referred to as femtos. In the art, macrocell base stations are sometimes referred to simply as macrocells.

Macrocells are good at providing radio coverage over a wide area. However, they are not suited to provide the call capacity required for high-speed data services. Smaller cells, such as provided by femtos, having fewer users are more appropriate. To cope with the increasing demand for high-speed data services, network operators are themselves increasingly deploying large numbers of small cell base stations, such as femtos, in addition to deploying macrocells. This approach involves cell planning, in other words, manual centralised planning of which macrocell base stations and femtocell base stations to locate where.

Femtos allow network operators to offload some traffic from the macrocellular network onto the femto network. Femtos currently deployed are mostly private access, so the offloading is basically only of calls or sessions of user terminals that are registered with the particular femto.

One known approach is to allow particular users of the macrocells who are not registered with a femto to nevertheless use that femto on a temporary, case-by-case, basis. When such a macrocell-user gets near to a femtocell that uses the same carrier frequency as the macrocell, the macrocell-user is handed over to the femto temporarily, until either the macrocell-user moves away or finishes his call. This handover is no as to avoid the call being dropped due to interference. This approach deals with the problem of femtos causing disruption to macrocell-users due to interference, but is not suitable for offloading of macrocell traffic to femtocells due to the large amount of additional control signalling involved to temporarily grant access to the unregistered user on an ad-hoc basis.

SUMMARY

The reader is referred to the appended independent claims. Some preferred features are laid out in the dependent claims.

An example of the present invention is a femtocell base station, the base station being switchable in use between a first mode of operation and a second mode of operation, in which in the first mode of operation only user terminals that are registered with the femtocell base station are connectable to the femtocell base station, and in the second mode of operation a user terminal that is not registered with the femtocell base station is connected to the femtocell base station.

In preferred embodiments, this selective switching of femtos between public access and private access modes enables more calls to be handled, as some calls to user terminals in the macrocell network are instead offloaded to femtos despite the user terminals not being registered users of those femtos. Accordingly, overall capacity is increased. For example, network operators may make use of femtos for macrocell traffic, particularly as femtos tend to be deployed in area with dense concentrations of users or in areas where that is a macrocell coverage gap.

In some embodiments, making use of femtos in this way may reduce overall power usage as compared to adding macrocell base stations to in order to address problems of insufficient capacity in the existing macrocellular network.

In some embodiments, determinations of which femtos are to switch mode are made and managed centrally by a server. Increased traffic or demand from macrocell users in the femtocells causes more femtos to switch to public access mode. Alternatively, when load or demand lessens, selected femtos are returned to private access mode.

Another example of the present invention is a method of controlling a femtocell base station. The method comprises: determining to switch the operating mode of the femtocell base station station; upon said determination instructing the femtocell base station to switch operating mode, and the femtocell base station switching operating mode. The operating modes comprise a first mode in which only user terminals that are registered with the femtocell base station are connectable to the femtocell base station, and a second mode in which a user terminal that is not registered with the femtocell base station is connectable to the femtocell base station. The method may be used in a cellular telecommunications network, in which the femtocell base station receives control signals as to whether to switch modes from a control server located elsewhere in the network.

BRIEF DESCRIPTION OF THE DRAWINGS

Embodiments of the present invention will now be described by way of example and with reference to the drawings, in which.

DETAILED DESCRIPTION

We now describe a network including femtocell base stations then look in greater detail at the structure and function of the femtocell base station.

Network

Figure 1:
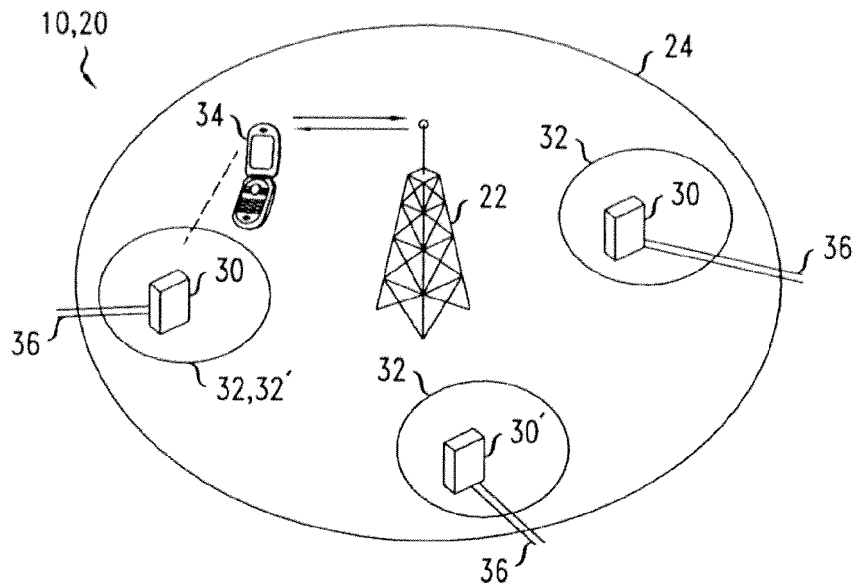
FIG. 1 is a diagram illustrating an example radio access network including a femtocell base station deployment within one macrocell according to a first embodiment of the invention.
Figure 2:
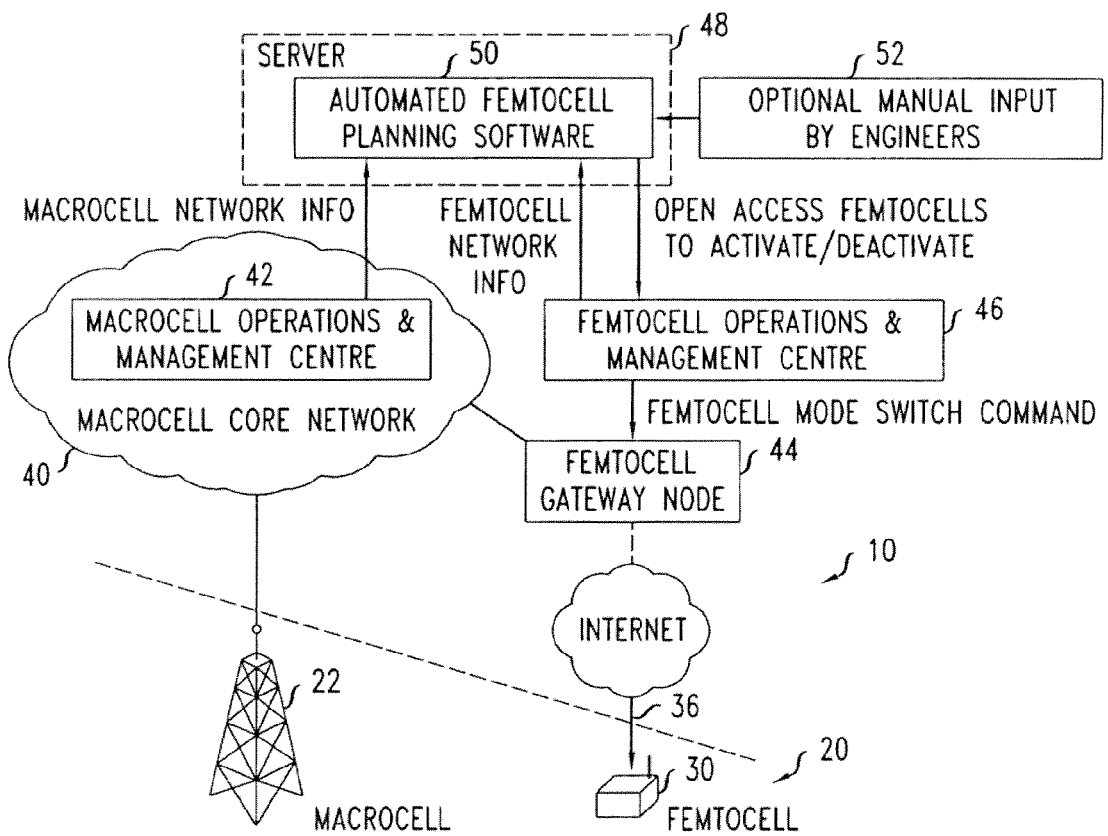
FIG. 2 is a diagram illustrating a wireless communications network including the radio access network shown in FIG. 1 and additional network elements according to the first embodiment of the invention.

As shown in FIGS. 1 and 2, a network 10 for wireless communications, through which a user terminal 34 may roam, includes two types of base station, namely macrocell base stations and femtocell base stations (the latter being sometimes called "femtos"). One macrocell base station 22 is shown in FIGS. 1 and 2 for simplicity.

As shown in FIG. 1, the network 10 includes a radio access network 20, in which each macrocell base station has a radio coverage area 24 that is often referred to as a macrocell. The geographic extent of the macrocell 24 depends on the capabilities of the macrocell base station 22 and the surrounding geography. Within the macrocell 24, each femtocell base station 30 provides wireless communications within a corresponding femtocell 32. A femtocell is a radio coverage area. The radio coverage area of the femtocell 32 is much less than that of the macrocell 24. For example, the femtocell 32 corresponds in size to a user's office or home.

In FIG. 1, three femtocell base stations 30 and corresponding femtocells 32 are shown for simplicity.

It is possible for a mobile terminal 34 within the macrocell 24 to communicate with the macrocell base station 22 in known manner. When the mobile terminal 34 enters into a femtocell 32 for which the mobile terminal is registered for communications within the femtocell base station 30, it is desirable to transfer the connection with the mobile terminal from the macrocell to the femtocell. In the example shown in FIG. 1, the user of mobile terminal 34 is a preferred user of the nearest 32' of the femtocells 32.

As shown in FIG. 1, the femtocell base stations 30 are connected via the broadband Internet Protocol connections ("backhaul") 36 to the cellular telecommunications core network (not shown in FIG. 1) and hence the rest of the telecommunications "world" (not shown in FIG. 1). The "backhaul" connections 36 allow communications between the femtocell base stations 30 through the core network (not shown). The macrocell base station is also connected to the core network (not shown in FIG. 1).

As shown in FIG. 2, each macrocell 22 is connected to a macrocell core network 40 that includes a macrocell operations and maintenance centre (OMC) 42 which is a central network entity for monitoring and management of the macrocell network. The femtos 30 are connected to a femtocell gateway node 44 via the broadband Internet Protocol connections ("backhaul") 36, in other words, the Internet. The femtocell gateway node 44 connects the femtos 30 to the macrocell core network 40 and also to a femtocell operations and management centre (OMC) 46 which provides centralised femto network monitoring and management.

The network 10 also includes a server 48 that incorporates an automated femtocell planning processor 50. The server 50 is connected to a manual input interface 52 which in this example is a computer terminal and keyboard.

Dual Mode Femto: Private Access and Public Access

Femtocells are provided that can operate in two modes: private access and public access, and can switch between those modes of operation according to need.

Private access is where a femto may only serve user terminals that are registered in an "allowed access" list of registered user terminals. For example, if the femto is for residential use, only the owner of the femto and members of the household are allowed access. If the femto is for business use, only employees at that workplace are allowed access.

Public access is where a femto is able to serve user terminals within the coverage area even if the user terminal is not registered in its "allowed access" list. In public access mode, the femto provides coverage to all users but gives priority to the registered users, so that calls of unregistered users, in other words those not on the "allowed access" list are only transferred to connection with the femto if the femto has capacity available. The owner of the femtocell may be given compensation for allowing public access to his/her femto.

The ability to switch between private access mode and public access mode allows traffic to be offloaded from the macrocell network to user-deployed femtos. This is done by selecting femtos that are at appropriate locations to become public access at appropriate times.

Figure 3:
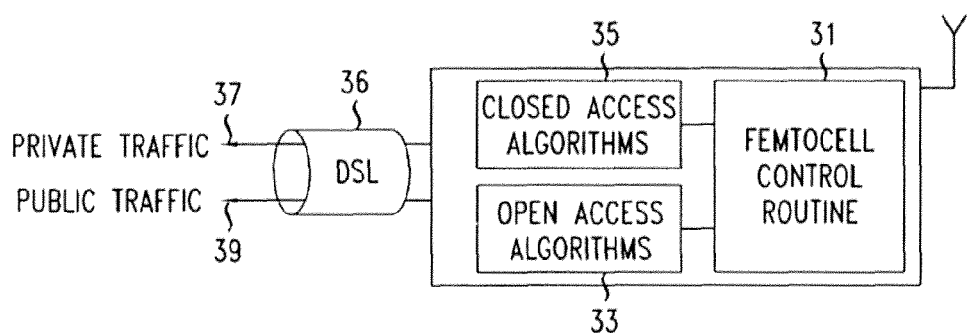
FIG. 3 is a diagram illustrating a femto shown in FIGS. 1 and 2, when in public access mode.

As shown in FIG. 3, a femtocell base station 30, sometimes denoted a "dual mode" femtocell base station, includes a processor 31 that controls various functions such as radio resource management and power control.

The processor selects public access algorithms 33 or private access algorithms 35 dependent on a control signal received from the server 48 via the femtocell OMC 46 and femtocell gateway 44. This is explained in more detail below. The private access algorithms 33 are those designed for private access operation such as algorithms to reduce the femtocell pilot channel powers so as to minimise the leakage of radio signals into busy public areas through which unregistered user terminals pass. The public access algorithms 35 are those suited for public access operation such as algorithms to increase pilot channel powers so as to maximise coverage into busy public areas.

When in private access mode, the femtocell base station 30 operates in a low capacity mode in which certain hardware (not shown) of the femto is deactivated. When in public access mode the femtocell base station is fully activated so operate at up to full capacity. Examples of such hardware (not shown) which can be selectably activated and deactivated are multi-core digital signal processors, in which individual cores can be switched off to reduce power consumption.

As mentioned above, the femto 30 uses broadband Internet Protocol connections ("backhaul") 36, also known as Digital Subscriber Line (DSL) connections, with the femtocell gateway 44. These connections are secure virtual connections involving encryption, specifically IPsec tunnels in this example. In private access mode, there is one virtual connection 37 to carry traffic from registered users back to the femtocell gateway 44.

In contrast, when in public access mode, a second virtual connection 39 is created. One of these connections 37 is then used to carry registered user's traffic; and the other 39 is used to carry traffic of users not registered with that femto 30. In other words, in public access mode, the two types of traffic are treated separately.

Switching Between Modes

Femtocells operate in private access mode by default. The automated femtocell planning processor 50 of the server 48 identifies femto candidates to become public access based on a combination of several criteria:

(a) whether the femto is located in a public "hotspot" such as a busy cafe or shopping area,
(b) whether the femto is located in a macrocell network coverage "hole",
(c) whether the femto is located in a macrocell that is experiencing problems, for example due to being overloaded or having suffered damage,
(d) whether the femto has such large spare capacity as to be considered underutilised, for example the femto, which is connected to a high capacity broadband connection, is currently rarely used,
(e) whether the femto is in a location where its operation in public access mode would not cause excessive radio interference to other femtos or to the macrocell.

This selection is done automatically in the femtocell planning processor 48 of the server 50. Additionally, an engineer may manually fine-tune the selection via the manual input interface 52.

The femtocell planning processor 50 obtains information required for the selection from databases (not shown) of subscriber information and the macrocell OMC 42 and femtocell OMC 46. This information includes both locations and traffic loads of the femto and macrocell base stations. This information is input into the femtocell planning processor 50 of the server 48.

As explained above, the processor 50 selects which femto or femtos should be switched to public access mode. Once those femtocells have been selected, the selected femtocells are sent a command by the femtocell OMC 46 over the network to switch into public access mode.

This process is dynamic in that the suitability of femtocells to continue in, or switch to, public access mode, is reevaluated periodically and repeatedly. This can be considered as an effectively continuous re-evaluation. Femtocells in public access mode for which that mode is no longer suitable are switched back to private access mode. This can occur, for example, when longer term traffic patterns change or when more suitable femtocells become deployed nearby. For example, a femtocell base station may be switched to the private access mode when the loading on the femtocell base station falls below a predetermined level and/or the rate of handover requests received from user terminals in the femtocell that are not registered with the femtocell base station falls below a given level. In this example, a network operator pays compensation to a femto owner for the femto being in public access mode. Another criterion in determining whether to switch modes is whether the amount of compensation to the femto owner goes too high, so it is no longer financially beneficial for the network operator to keep the femto in public access mode. For example, if so, then the femto may be switched back to private access mode.

In this example a network operator obtains permissions in advance from owners of femtos to switch between private and public access modes. For example, the permissions are obtained upon purchase or initial deployment of the respective femto. In an alternative embodiment, permission may be obtained on an ad-hoc basis after identification of the femto that it is desired to switch into public access mode, but before the switch to public access mode occurs. Making use of femtos for normally-macrocellular traffic alleviates the requirement for extra macrocell base stations in order to increase overall capacity. It has been found that having a fraction of the femtos public access, typically say 20-30%, provides good additional capacity with low additional cost to network operators.

Distributed Control Alternative Example

The example described above in respect of FIGS. 1 to 3 can be considered to involve centralised control by a server; an alternative is distributed control where the decisions whether to switch from private access mode to public access mode, or vice versa, are made by the femtos themselves.

Each femto in private access mode independently and periodically makes a decision whether or not to switch to public access mode based on local criteria. Specifically, each femto monitors the long term usage pattern that it experiences, and also measuring the rate of handover requests from unregistered users that it receives. Upon identifying itself, on the one hand in terms of usage as currently underutilised and having significant spare capacity, and also, on the other hand, receiving a large number of handover requests from unregistered users indicating that the femto is close to a busy public area, then the femto decides to switch to public access mode.

Conversely, a femto in public access mode switches back to private access mode when the femto determines that usage by registered users has increased such that it is no longer underutilised by registered users, or the femto determines that insufficient unregistered users are using the femto.

General

The approach is applicable to various types of femtocell or femtocell type network, and various types of technologies including Long Term Evolution (LTE), Universal Mobile Telecommunications System (UMTS), WiMAX and so on.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. Some embodiments involve computers programmed to perform said steps of the above-described methods.

The invention claimed is:

1. A femtocell base station, the base station being switchable in use between a first mode of operation and a second mode of operation, in which in the first mode of operation only user terminals that are registered with the femtocell base station are connectable to the femtocell base station, and in the second mode of operation a user terminal that is not registered with the femtocell base station is connectable to the femtocell base station, wherein the first mode comprises private access and the second mode comprises public access.

2. A femtocell base station according to claim 1, in which the base station includes a switch and a control processor, the control processor being operative to control the switch so as to selectably switch between the first and second modes.

3. A femtocell base station according to claim 2, in which the control processor in use receives a control signal to switch between the modes from a control server located elsewhere in the network.

4. A femtocell base station according to claim 2 implemented in a cellular telecommunications network comprising the base station, and a control server located elsewhere in the network, the control processor in use receiving control signals to switch between the modes from the control server.

5. A femtocell base station according to claim 2, in which the control processor in the femtocell base station determines whether to switch between the modes.

6. A femtocell base station according to claim 1, in which in the first mode of operation an algorithm is employed to reduce transmit signal power so as to reduce or avoid coverage of a public area.

7. A femtocell base station according to claim 1, in which in the second mode of operation an algorithm is employed to increase transmit signal power so as to increase coverage of a public area.

8. A femtocell base station according to claim 7, in which in the second mode of operation the algorithm takes into account level of radio interference to other base stations caused by increasing the power.

9. A method of controlling a femtocell base station, comprising:
   determining to switch the operating mode of the femtocell base station station;
   upon said determination instructing the femtocell base station to switch operating mode, and the femtocell base station switching operating mode;
   the operating modes comprising a first mode in which only user terminals that are registered with the femtocell base station are connectable to the femtocell base station, and a second mode in which a user terminal that is not registered with the femtocell base station is connectable to the femtocell base station, wherein the first mode comprises private access and the second mode comprises public access.

10. A method according to claim 9, in which the determination to switch is dependent upon the level of loading of the femtocell base station.

11. A method according to claim 10, in which the determination is made to switch to the second mode upon the loading being determined as greater than a given amount.

12. A method according to claim 9, in which the determination to switch depends on the rate of hand over requests received from user terminals in the femtocell that are not registered with the femtocell base station as permitted users.

13. A method according to claim 12, in which the determination is made to switch to the second mode upon the rate being determined as greater than a given level.

14. A method according to claim 9, in which compensation is paid to an owner of the femtocell base station for the femtocell base station being in public access mode, and the determination to switch depends upon whether the amount of the compensation exceeds a given threshold.

15. A method according to claim 9 in which determination whether to switch is repeated so as to dynamically select the operating state of the femtocell base station.

16. A femtocell base station according to claim 1, in which the determination to switch depends on rate of hand over requests received from user terminals in the femtocell that are not registered with the femtocell base station as permitted users.

17. A femtocell base station according to claim 16 in which the determination is made to switch to the second mode upon the rate being determined as greater than a given level.

18. A femtocell base station, the base station being switchable in use between a first mode of operation and a second mode of operation, in which in the first mode of operation only user terminals that are registered with the femtocell base station are connectable to the femtocell base station, and in the second mode of operation a user terminal that is not registered with the femtocell base station is connectable to the femtocell base station.

19. A method of controlling a femtocell base station, comprising:
   determining to switch the operating mode of the femtocell base station station;
   upon said determination instructing the femtocell base station to switch operating mode, and the femtocell base station switching operating mode;
   the operating modes comprising a first mode in which only user terminals that are registered with the femtocell base station are connectable to the femtocell base station, and a second mode in which a user terminal that is not registered with the femtocell base station is connectable to the femtocell base station.

20. A base station, the base station being switchable in use between a first mode of operation and a second mode of operation, in which in the first mode of operation only user terminals that are registered with the base station are connectable to the base station, and in the second mode of operation a user terminal that is not registered with the base station is connectable to the base station, wherein the base station is a femtocell base station and the determination to switch depends on a rate of handover requests received from user terminals in the coverage area of the femtocell base station that are not registered with the femtocell base station as permitted users and in which the determination is made to switch to the second mode upon the rate being determined as greater than a given level.

21. A method of controlling a base station, comprising:
   determining to switch the operating mode of the base station station;
   upon said determination instructing the base station to switch operating mode, and the base station switching operating mode;
   the operating modes comprising a first mode in which only user terminals that are registered with the base station are connectable to the base station, and a second mode in which a user terminal that is not registered with the base station is connectable to the base station, wherein the base station is a femtocell base station and the determination to switch depends on a rate of handover requests received from user terminals in the coverage area of the femtocell base station that are not registered with the femtocell base station as permitted users and in which the determination is made to switch to the second mode upon the rate being determined as greater than a given level.

* * * * *